US012766538B2

(12) United States Patent
Huang

(10) Patent No.: US 12,766,538 B2
(45) Date of Patent: Oct. 20, 2026

(54) SMALL SPRAY PUMP HEAD

(71) Applicant: YUYAO AOHONG PLASTIC CO., LTD, Ningbo City (CN)

(72) Inventor: Honghu Huang, Ningbo City (CN)

(73) Assignee: YUYAO AOHONG PLASTIC CO., LTD, Ningbo City (CN)

( * ) Notice: Subject to any disclaimer, the term of this patent is extended or adjusted under 35 U.S.C. 154(b) by 138 days.

(21) Appl. No.: 18/664,672

(22) Filed: May 15, 2024

(65) Prior Publication Data

US 2025/0178009 A1 Jun. 5, 2025

(30) Foreign Application Priority Data

Nov. 30, 2023 (CN) ........................ 202311628676.0

(51) Int. Cl.
*B05B 11/00* (2023.01)
*B05B 11/10* (2023.01)

(52) U.S. Cl.
CPC ...... *B05B 11/1074* (2023.01); *B05B 11/1001* (2023.01); *B05B 11/1047* (2023.01)

(58) Field of Classification Search
CPC ............ B05B 11/1074; B05B 11/1047; B05B 11/1001; B05B 11/1053; B05B 11/007; B65D 83/20; B65D 83/206
USPC ................................... 222/321.7, 383.1–385
See application file for complete search history.

(56) References Cited

U.S. PATENT DOCUMENTS 3,180,534 A * 4/1965 Duda .................. B05B 11/1047 222/542
3,231,150 A * 1/1966 Holm ................... B65D 83/546 222/394
3,858,771 A * 1/1975 Bret ........................ F16K 1/306 222/402.2
5,105,988 A * 4/1992 Knickerbocker ... B05B 11/1052 239/115
5,207,785 A * 5/1993 Knickerbocker .... B65D 83/206 222/514
5,360,145 A * 11/1994 Gueret ................ B05B 11/1016 222/105
5,785,208 A * 7/1998 Dobbs ................. B05B 11/1053 222/321.2
6,158,625 A * 12/2000 Siegel ................. B05B 11/1053 222/342
6,257,451 B1 * 7/2001 Siegel ................. B05B 11/1053 239/106
7,104,424 B2 * 9/2006 Kolanus ................. B65D 83/20 177/245

(Continued)

*Primary Examiner* — Charles P. Cheyney
(74) *Attorney, Agent, or Firm* — Oliff PLC

(57) ABSTRACT

The present invention relates to a compact spray pump head that addresses the inconveniences and high production costs associated with existing similar products. Specifically, it tackles technical issues and design flaws such as poor spray effectiveness and the occurrence of back suction. The pump head is the inclusion of a large circular plunger hole at the liquid outlet, the outer diameter of the plunger hole within the large circle is sequentially provided with a bush groove and a spring groove, where the spring is placed in the spring groove of the large circle. The inner wall of the inner sleeve features a wall guide groove, the top cover groove of the inner plug is provided with an upwardly protruding cover groove, with the thru-hole of the inner plug located within the cover piece.

7 Claims, 4 Drawing Sheets

(56) References Cited

U.S. PATENT DOCUMENTS

| | | | | |
|---|---|---|---|---|
| 7,287,672 | B2 * | 10/2007 | Garcia | B05B 11/104 222/321.9 |
| 7,467,732 | B2 * | 12/2008 | Bougamont | B05B 11/1018 222/321.2 |
| 9,493,293 | B2 * | 11/2016 | Benson | B05B 11/1053 |
| 2008/0251542 | A1 * | 10/2008 | Rossignol | B05B 11/1066 222/321.9 |
| 2014/0061243 | A1 * | 3/2014 | Goettke | B05B 11/1053 222/321.7 |
| 2021/0220854 | A1 * | 7/2021 | Goettke | B05B 11/028 |
| 2021/0283629 | A1 * | 9/2021 | Lamboux | B05B 11/0044 |

* cited by examiner

SMALL SPRAY PUMP HEAD

TECHNICAL FIELD

The present invention relates to a spray nozzle for mini sprayers and in particular, a small spray pump head.

BACKGROUND ART

The plastic spray nozzle of a mini aerosol dispenser is commonly utilized for cosmetic spraying by pressing the head cap. Typically, the spray nozzle is equipped with a metal spring. An example of this is found in China's patent documents under the application publication number CN110789842A, dated 2020 Feb. 14, titled "Antimicrobial polymer snap nozzle and its preparation method". Another patent document, CN103842033A, dated 2014 Jun. 4, titled "Antimicrobial polymer snap nozzle and its preparation method". In this case, the invention is titled "Fan-shaped spray structure for use in a dispensing actuator". However, these spray nozzles and similar products usually require the combination of the head cap through the pump core extending a large circle of the valve stem for use. This process makes production and assembly more cumbersome, increases production costs, leads to poor spraying effects, and may result in back suction.

SUMMARY OF THE INVENTION

In order to overcome the above deficiencies, the aim of the present invention is to provide a small spray pump head to the field, so that it is designed to solve the existing similar products production and assembly is more inconvenient, production costs are higher, especially when the spray effect is poor, it is likely to incur back suction which is considered a technical challenge. The purpose is achieved by the following technical solutions.

A small spray pump head, comprising of a head cap, an inner plug, a spring, and a large ring, the head cap has a spray hole on one side, while the inner plug is placed in the liquid outlet hole of the large ring; wherein the liquid outlet hole of the large ring is a plunger hole, with the plunger hole on top of the large ring communicating with the suction tube hole on the bottom. The plunger hole of the large ring has a bush groove and a spring groove sequentially disposed around its outer diameter, with the spring placed in the spring groove; the inner plug is T-shaped, with the lower sleeve level having an upper spring plug. The lower bush of the inner plug also has a central column and a wall guide groove in the lower bush. The said wall guide groove is connected to the thru-hole on top of the inner hole; the central column of the inner plug is inserted into the plunger hole of the large ring, while the lower bush of the inner plug is inserted into the bush rod groove of the large ring. One end of the spring is placed against the bottom inside of the spring groove of the large ring, with the other end placed against the lower ring groove on the bottom of the upper spring plug of the inner plug; the outer diameter of the lower ring groove of the inner plug is an elastic sleeve, a spring cavity is formed as the groove mouth at the lower ring groove of the inner plug is placed against the groove mouth outside of the spring groove of the large spring, the spring is then sealed within this cavity. A top cover groove is disposed on top of the upper spring plug of the inner plug, and an upwardly protruding cover piece is disposed in the top cover groove of the inner plug. The thru-hole of the inner plug is located within the said cover piece: Upon pressing the head cap, the inner plug moves downward to cause deformation of the spring, cover piece, and the elastic sleeve of the inner plug, the thru-hole of the inner plug is sealed by the cover piece, allowing liquid to be sprayed through the spray hole of the head cap via the wall guide groove of the inner plug, and by means of atomization resulting from the deformation of cover piece and the elastic sleeve of the inner plug. There are retained seals between the inner diameter of the head cap and the outer diameter of the upper spring plug of the inner plug, and the outer diameter of the mouth of the elastic groove of the large circle; upon releasing the head cap, the inner plug moves upwardly and the spring, the cover piece and the inner plug of the elastic sleeve return to the original positions, the cover piece at the thru-hole of the inner hole opens, allowing air to enter the large circle via the clearance formed between the inner diameter of the head cap and the large circle, inner plug, or via the spray hole of the head cap, and the wall guide groove of the inner plug. The spring is a metal or plastic spring.

The mouth edge of the said cover piece is provided with a downwardly protruding sealing skirt, or the outer radial direction of the sealing skirt is upwardly upturned to fit into the beveled edge of the inner diameter of the cap groove at the top of the inner plug, and the sealing skirt of the cover piece is placed and sealed against the inner thru-hole in the cap groove at the top of the inner plug. Two types of structural embodiments of the cover piece are described above, each corresponding to a specific locating cylindrical pin or locating ring design, thereby enhancing its stability against deformation.

The said cover piece is provided with a raised locating cylindrical pin or locating ring bar in the middle of the top of said cover piece, the locating cylindrical pin or the locating ring bar is inserted into the corresponding groove at the top of the head cap.

A raised step bar is provided at the chamfer of the outer diameter of the plunger hole at the bottom of the bush groove of the said large ring, the bottom part of the lower bush to which the step bar corresponds to the inner plug is provided with a lower bush groove. Upon pressing the head cap, the lower bush of the inner plug is constrained by the step bar of the large ring, and the mouth of the lower ring groove of the inner plug deforms outwardly and is sealed to the inner diameter of the head cap.

The said head cap is provided with an inwardly protruding cap mouth bar, the outer diameter of the cap mouth bar of the large circle in the head cap above the cap mouth bar is provided with a raised groove ring, the groove mouth ring of the large ring is inserted into the cap mouth bar of the head cap by interference fit, the lower outer diameter of the cap mouth ring is sealed against the cap mouth bar of the head cap.

The groove mouth outer diameter of the lower ring groove of the upper spring plug in the said inner plug is outwardly protruding and stretching out, and is placed and sealed against the inner diameter of the head cap; the bush hole outer diameter at the lower bush of the inner plug is outwardly protruding and stretching out, and is placed and sealed against the inner wall at the bush groove of the large ring; the spray hole of the head cap is located on one side above where the groove mouth outer diameter of the said lower ring groove is outwardly protruding and stretching out.

The inner diameter of the groove mouth at the lower ring groove of the said inner plug is provided with an inner pour outlet underneath the groove mouth, and the said inner pour outlet is located above the groove mouth outer diameter of the spring groove of the large spring; upon pressing the head cap, the inner pour outlet of the inner plug is constrained against the groove mouth outer diameter of the large spring.

The inner wall of the lower bush of the said inner plug is provided with three equally spaced wall guide grooves, correspond to the three thru-holes on top of the inner plug. The number of wall guide grooves and corresponding thru-holes of the above mentioned inner plugs are set as required.

The ring mouth inner diameter at the bottom of the large ring is provided with a raised bottle mouth bar or ring mouth inner threads. The large ring is snap-fit to the mouth of the bottle body through the bottle mouth bar, or the large ring is revolvably fixed to the bottle mouth outer threads of the bottle body through the ring mouth inner threads.

The inner diameter of the bottle mouth bar (406) of the said large ring is provided with a raised inner bottle groove, the large ring is snap-fit to the mouth of the outer bottle body, and the large ring is securely set to the mouth of the inner bottle body. The said large ring is fixed to the mouth of the bottle in such a way that the bottom structure of the pump head can be used for internal and external bottles fixed by means of setting or for individual bottles fixed by means of setting, as required.

The present invention features a well-designed structure, effective sealing and stability, streamlined production and assembly processes, and a versatile range of applications. Notably, its compact size and excellent resistance to back suction effect make it ideal for serving as a spray pump head in daily-use cosmetics, while also offering structural enhancements over similar products.

BRIEF DESCRIPTION OF ACCOMPANYING DRAWINGS

Figure 1:
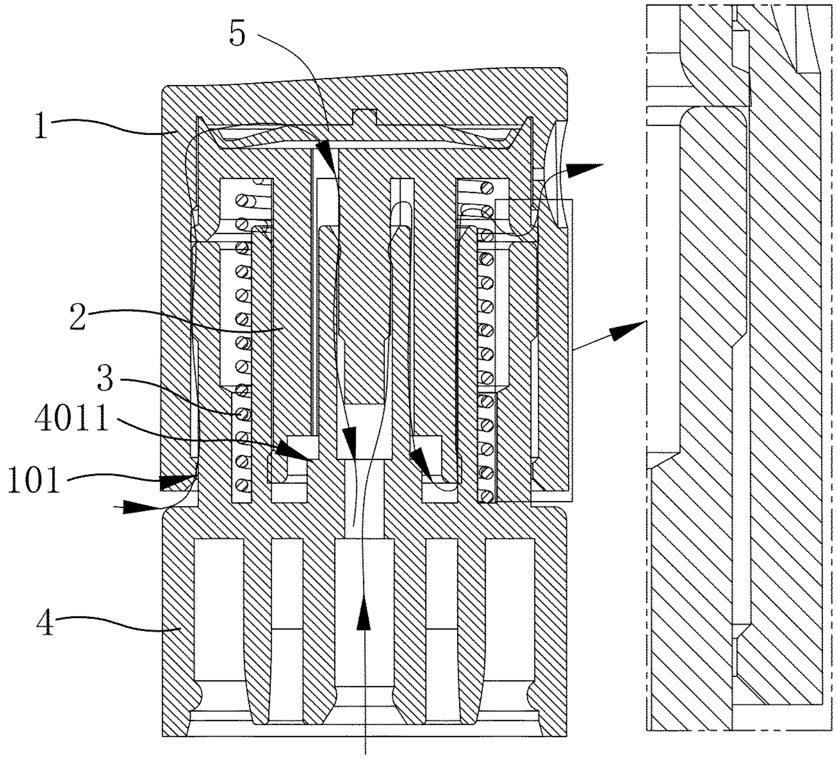
FIG. 1 is a cross-sectional structural schematic diagram of an embodiment of the present invention, in which the framed portion is enlarged, and the arrows indicate the direction of air inlet and liquid outlet, respectively.
Figure 2:
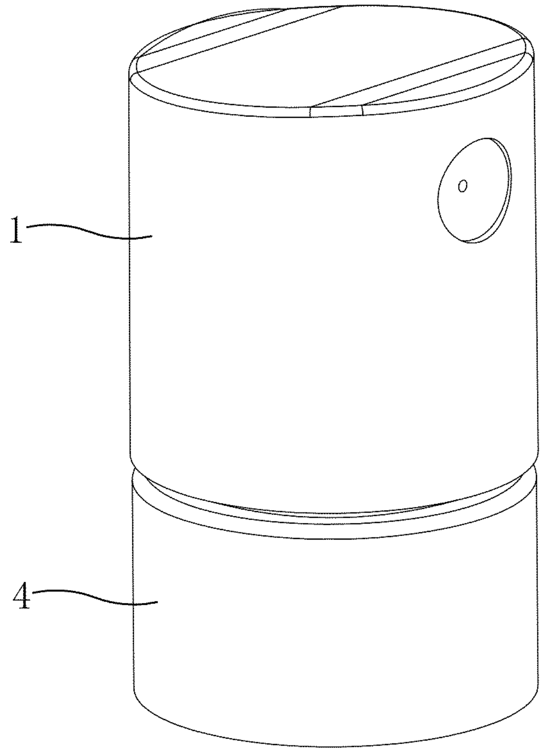
FIG. 2 is a schematic diagram of the three-dimensional structure of FIG. 1.
Figure 3:
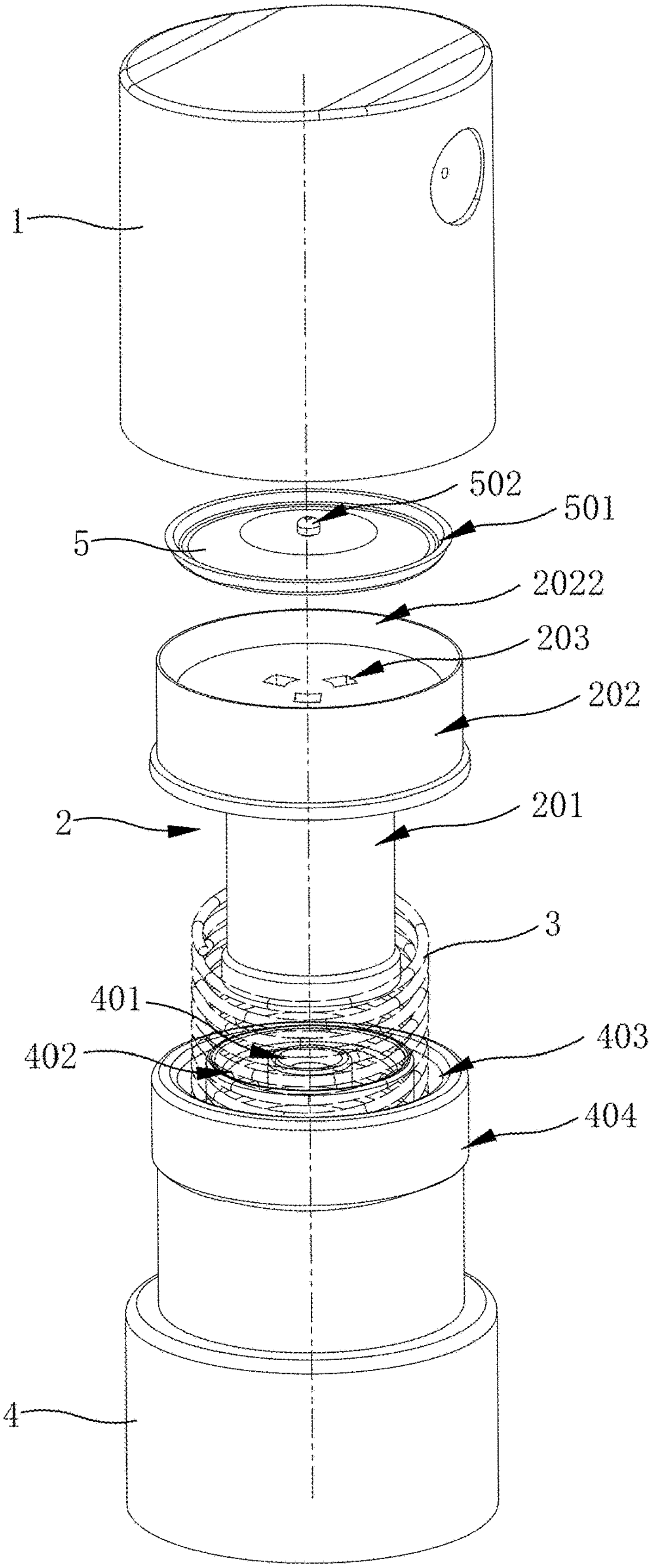
FIG. 3 is a schematic diagram of the exploded structure of FIG. 2, in which the dotted line is the spring.
Figure 4:
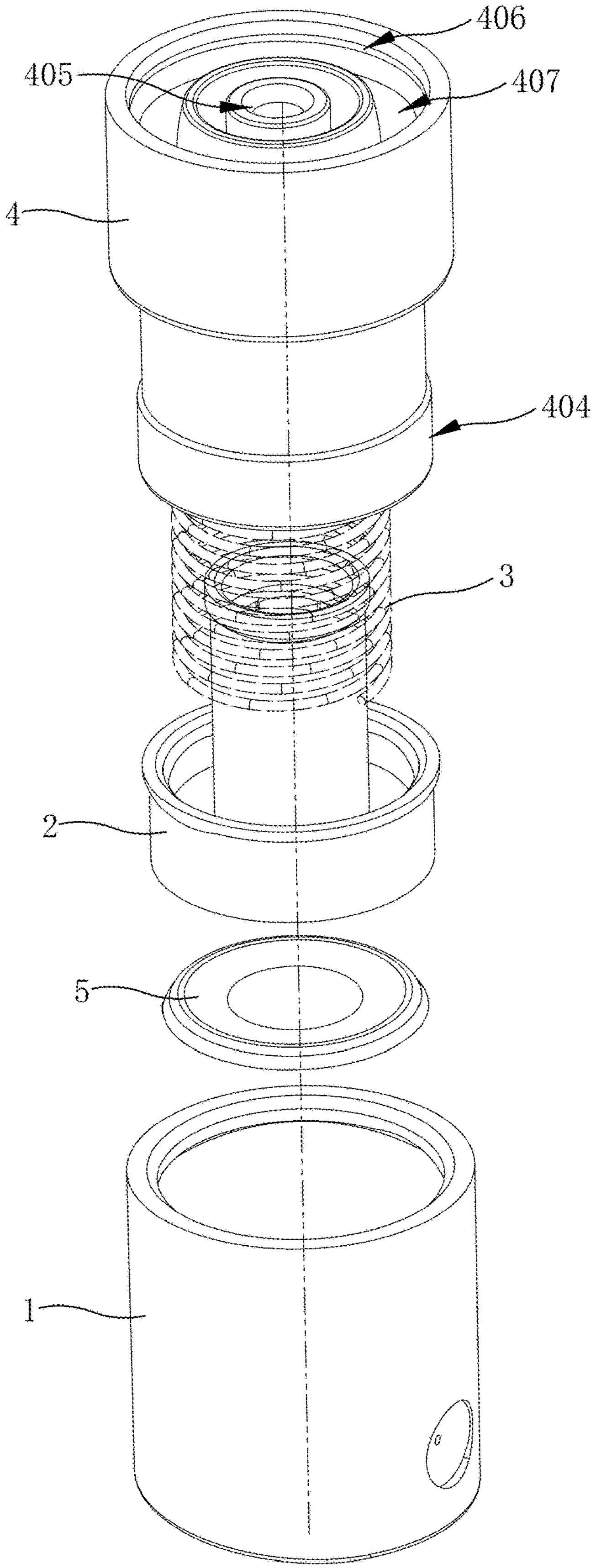
FIG. 4 is a schematic diagram of the bottom exploded structure of FIG. 3.
Figure 5:
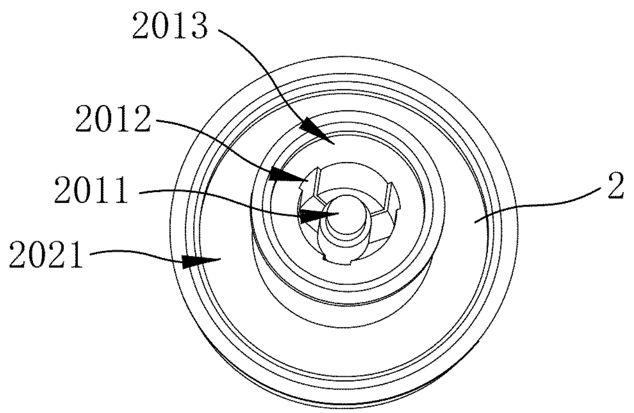
FIG. 5 is a schematic diagram of the bottom structure of the inner plug of FIG. 4.

Serial numbers and names of the accompanying drawings: 1. Head cap, 101. Cap mouth bar, 2. Inner plug, 201. Lower bush, 2011. Central column, 2012. Wall guide groove, 2013. Lower bush groove, 202. Upper spring plug, 2021. Lower ring groove, 2022. Top cover groove, 203. Thru-hole, 3. Spring, 4. Large ring, 401. Plunger hole, 4011. Step bar, 402. Bush groove, 403. Spring groove, 404. Groove mouth ring, 405. Suction tube hole, 406. Bottle mouth bar, 407. Inner bottle groove, 5. Cap piece, 501, Sealing skirt, 502. Locating cylindrical pin.

EMBODIMENTS

The structure of the present invention is now further described in conjunction with the accompanying drawings. As shown in FIGS. 1-5, the small spray pump head comprises of a head cap 1, an inner plug 2, a spring 3, and a large ring 4, the head cap has a spray hole on one side, while the inner plug is placed in the liquid outlet hole of the large ring. The spring is a metal spring. The particular structure is described below: the liquid outlet hole of the large ring is a plunger hole 401, with the plunger hole on top of the large ring communicating with the suction tube hole 405 on the bottom. The plunger hole of the large ring has a bush groove 402 and a spring groove 403 sequentially disposed around its outer diameter, with the spring placed in the spring groove; the inner plug (2) is T-shaped, with the lower sleeve level 201 having an upper spring plug 202. The lower bush of the inner plug also has a central column 2011 and a wall guide groove 2012 in the lower bush. The said wall guide groove is connected to the thru-hole 203 on top of the inner hole; the central column of the inner plug is inserted into the plunger hole of the large ring, while the lower bush of the inner plug is inserted into the bush rod groove of the large ring. One end of the spring is placed against the bottom inside of the spring groove of the large ring, with the other end placed against the lower ring groove 2021 on the bottom of the upper spring plug of the inner plug; the outer diameter of the lower ring groove of the inner plug is an elastic sleeve, a spring cavity is formed as the groove mouth at the lower ring groove of the inner plug is placed against the groove mouth outside of the spring groove of the large spring, the spring is then sealed within this cavity. A top cover groove 2022 is disposed on top of the upper spring plug of the inner plug, and an upwardly protruding cover piece 5 is disposed in the top cover groove of the inner plug. The thru-hole of the inner plug is located within the said cover piece: Upon pressing the head cap, the inner plug moves downward to cause deformation of the spring, cover piece, and the elastic sleeve of the inner plug, the thru-hole of the inner plug is sealed by the cover piece, allowing liquid to be sprayed through the spray hole of the head cap via the wall guide groove of the inner plug, and by means of atomization resulting from the deformation of cover piece and the elastic sleeve of the inner plug. There are retained seals between the inner diameter of the head cap and the outer diameter of the upper spring plug of the inner plug, and the outer diameter of the mouth of the elastic groove of the large circle; upon releasing the head cap, the inner plug moves upwardly and the spring, the cover piece and the inner plug of the elastic sleeve return to the original positions, the cover piece at the thru-hole of the inner hole opens, allowing air to enter the large circle via the clearance formed between the inner diameter of the head cap and the large circle, inner plug, or via the spray hole of the head cap, and the wall guide groove of the inner plug.

Figure 6:
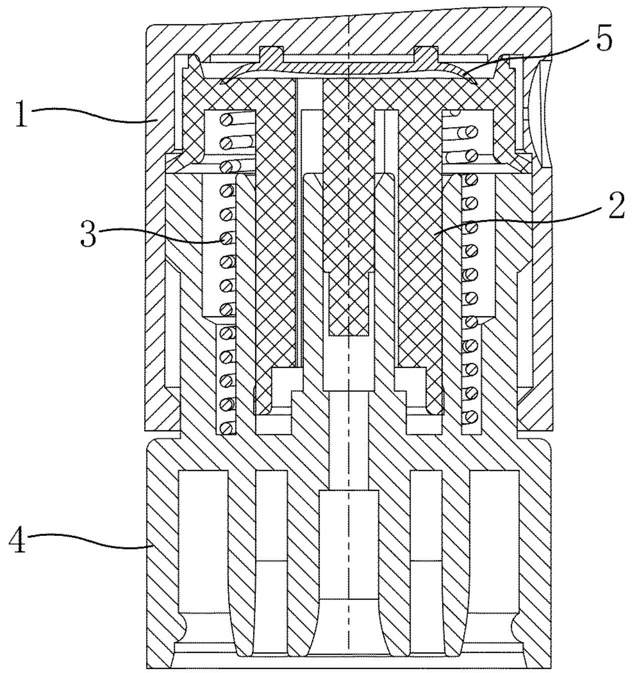
FIG. 6 is a schematic diagram of the sectional structure of the second embodiment of the present invention.

The mouth edge of the said cover piece (5) is provided with a downwardly protruding sealing skirt 501, or the outer radial direction of the sealing skirt is upwardly upturned to fit into the beveled edge of the inner diameter of the cap groove at the top of the inner plug, and the sealing skirt of the cover piece is placed and sealed against the inner thru-hole in the cap groove at the top of the inner plug; the said cover piece is provided with a raised locating cylindrical pin 502 in the middle of the top of said cover piece, the locating cylindrical pin is inserted into the corresponding groove at the top of the head cap. Alternatively, as illustrated in FIG. 6, the cover piece features a sealing skirt that is downwardly protruding along the mouth edge, while a raised locating ring bar is located at the top center of the cover piece for insertion into a matching groove within the head cap.

A raised step bar 4011 is provided at the chamfer of the outer diameter of the plunger hole at the bottom of the bush groove of the said large ring, the bottom part of the lower bush to which the step bar corresponds to the inner plug is provided with a lower bush groove 2013. Upon pressing the head cap, the lower bush of the inner plug is constrained by the step bar of the large ring, and the mouth of the lower ring groove of the inner plug deforms outwardly and is sealed to the inner diameter of the head cap. The bottom cap mouth of the said head cap is provided with an inwardly protruding cap mouth bar 101, the outer diameter of the cap mouth bar of the large circle in the head cap above the cap mouth bar is provided with a raised groove ring 404, the groove mouth ring of the large ring is inserted into the cap mouth bar of the head cap by interference fit, the lower outer diameter of the cap mouth ring is sealed against the cap mouth bar of the head cap. The bush hole outer diameter at the lower bush of the inner plug is outwardly protruding and stretching out, and is placed and sealed against the inner wall at the bush groove of the large ring; the spray hole of the head cap is located on one side above where the groove mouth outer diameter of the said lower ring groove is outwardly protruding and stretching out. The inner diameter of the groove mouth at the lower ring groove of the said inner plug is provided with an inner pour outlet underneath the groove mouth, and the said inner pour outlet is located above the groove mouth outer diameter of the spring groove of the large spring; upon pressing the head cap, the inner pour outlet of the inner plug is constrained against the groove mouth outer diameter of the large spring. The inner wall of the lower bush of the said inner plug is provided with three equally spaced wall guide grooves, correspond to the three thru-holes on top of the inner plug.

The ring mouth inner diameter at the bottom of the large ring is provided with a raised bottle mouth bar 406. The large ring is snap-fit to the mouth of the bottle body through the bottle mouth bar. The inner diameter of the bottle mouth bar of the said large ring is provided with a raised inner bottle groove 407, the large ring is snap-fit to the mouth of the outer bottle body, and the large ring is securely set to the mouth of the inner bottle body.

When used, the suction tube hole of the large ring is filled with a suction tube, the large ring is set into the mouth of the outer bottle body and the mouth of the inner bottle body at the same time. Upon pressing the head cap, the inner plug moves downward to cause deformation of the spring, cover piece, and the elastic sleeve of the inner plug, the groove mouth of the lower ring groove of the inner plug is outwardly deformed and sealed in the inner diameter of the head cap, allowing liquid to be sprayed through the spray hole of the head cap via the wall guide groove of the inner plug, and by means of atomization resulting from the deformation of cover piece and the elastic sleeve of the inner plug. Upon releasing the head cap, the inner plug moves upwardly and the spring, the cover piece and the inner plug of the elastic sleeve return to the original positions, allowing air to enter the pump head, waiting for the next use by pressing of the head cap.

The invention claimed is:

1. A small spray pump head, comprising;

a head cap including a spray hole on one side;

an inner plug;

a spring;

a large ring including a liquid outlet hole at a top of the large ring and a suction tube hole at a bottom of the large ring, the liquid outlet hole being in communication with the suction tube hole;

the inner plug is the liquid outlet hole of the large ring;

a cover piece between the head cap and a top surface of the inner plug;

wherein the liquid outlet hole of the large ring has a bush groove and a spring groove around an outer diameter of the liquid outlet hole, and the spring is in the spring groove;

the inner plug is T-shaped and includes a lower sleeve level and an upper spring plug;

a lower bush of the inner plug includes a central column and a wall guide groove;

the wall guide groove in communication with a thru-hole that passes through a top surface of the inner plug;

the central column of the lower bush of the inner plug is inserted into the liquid outlet hole of the large ring, while the lower bush of the inner plug is inserted into the bush groove of the large ring;

one end of the spring presses against a bottom inside of the spring groove of the large ring, and another end of the spring presses against a lower ring groove at a bottom of the upper spring plug of the inner plug;

an outer wall of the lower ring groove of the inner plug is an elastic sleeve;

a spring cavity is formed between the large ring and the inner plug, and the spring fully encloses and sealed within the spring cavity in a condition in which the outer wall of the lower ring groove of the inner plug is placed against an outer wall of the spring groove of the large ring;

the thru-hole of the inner plug is covered by the cover piece;

the inner plug is configured to move downward upon downward movement of the head cap thereby causing deformation of the spring causing deformation of the elastic sleeve of the inner plug, causing the cover piece to seal the thru-hole of the inner plug and allowing liquid to travel through the wall guide groove of the inner plug, through the spring cavity, and out of the spray hole of the head cap;

the inner plug is configured to move upward upon upward movement of the head cap, thereby causing the cover piece to move away from the thru-hole of the inner plug, and allowing air to enter the suction tube hole of the large ring via (i) a clearance formed between an inner surface of the head cap and the large ring, the thru-hole of the inner plug, and the wall guide groove of the inner plug or (ii) via the spray hole of the head cap, the thru-hole of the inner plug, and the wall guide groove of the inner plug;

wherein the cover piece is provided with a downwardly protruding sealing skirt and an outer edge of the sealing skirt is upwardly upturned to fit against a beveled edge of an inner circumferential surface of a top cover groove at a top of the inner plug and the sealing skirt of the cover piece surrounds the thru-hole of the inner plug; and wherein the cover piece includes a raised locating pin or a raised locating ring bar, the locating cylindrical pin or the locating ring bar being inserted into a corresponding groove in the head cap.

2. A spray pump head according to claim 1, wherein a step bar is provided on the large ring, the lower bush of the inner plug is configured to abut against the step bar of the large ring upon the downward movement of the head cap, and the outer wall of the lower ring groove of the inner plug is configured to deform outwardly and be sealed to the inner surface of the head cap upon the downward movement of the head cap.

3. A spray pump head according to claim 1, wherein a bottom edge of the head cap includes an inwardly protruding cap mouth bar, an outer surface of the large ring includes a raised ring, the raised ring of the large ring is inserted into the cap mouth bar of the head cap by interference fit, and a lower edge of raised ring abuts against the cap mouth ring, thereby restricting separation of the head cap and the large ring.

4. A spray pump head according to claim 1, wherein:

a lower edge of the outer wall of the lower ring groove of the upper spring plug of the said inner plug protrudes outward and seals against the inner surface of the head cap;

a lower edge of the lower bush of the inner plug protrudes outward and seals against an inner wall of the bush groove of the large ring; and the spray hole of the head cap is located on one side above where the lower edge of the outer wall of the lower ring groove protrudes outward.

5. A spray pump head according to claim 1, wherein the wall guide groove comprises a plurality of wall guide grooves, and the thru-hole comprises a plurality of thru-holes corresponding respectively to the wall guide grooves.

6. A wall-spray pump head according to claim 1, wherein the the large ring includes (i) a raised bottle mouth bar configured to attach to a mouth of a bottle body, or (ii) ring mouth inner threads configured to attach to a mouth of a boule body.

7. A spray pump head according to claim 6, wherein the large ring includes an inner bottle groove, the large ring being configured to snap-fit to the mouth of the bottle body and to be securely set to the mouth of the bottle body.

* * * * *